United States Patent [19]

Kanehiro et al.

[11] Patent Number: 5,046,461

[45] Date of Patent: Sep. 10, 1991

[54] VALVE CONTROL SYSTEM FOR INTERNAL COMBUSTION ENGINES

[75] Inventors: Masaki Kanehiro; Masakazu Sakaguchi, both of Wako, Japan

[73] Assignee: Honda Giken Kogyo Kabushiki Kaisha, Tokyo, Japan

[21] Appl. No.: 511,051

[22] Filed: Apr. 19, 1990

[30] Foreign Application Priority Data

| Apr. 19, 1989 | [JP] | Japan | 1-99640 |
| Apr. 19, 1989 | [JP] | Japan | 1-99641 |
| Apr. 19, 1989 | [JP] | Japan | 1-99642 |

[51] Int. Cl.$^5$ .................. B60K 28/16; F01L 1/26
[52] U.S. Cl. ........................ 123/90.15; 123/90.16; 180/197
[58] Field of Search .......... 123/90.15, 90.16, 90.17; 180/197

[56] References Cited

U.S. PATENT DOCUMENTS

| 4,800,850 | 1/1989 | Yoshida et al. | 123/90.16 |
| 4,883,027 | 11/1989 | Oikawa et al. | 123/90.16 |
| 4,921,064 | 5/1990 | Wazaki et al. | 180/197 |
| 4,959,794 | 9/1990 | Shiraishi et al. | 180/197 |
| 4,969,102 | 11/1990 | Tamura et al. | 180/197 |
| 4,971,164 | 11/1990 | Fujita et al. | 180/197 |

FOREIGN PATENT DOCUMENTS 0215430 9/1988 Japan ...................... 180/197

Primary Examiner—Willis R. Wolfe
Assistant Examiner—Weilun Lo
Attorney, Agent, or Firm—Lyon & Lyon

[57] ABSTRACT

A valve control system controls the valve lift characteristic of at least one set of a set of inlet valves and a set of exhaust valves of an internal combustion engine installed in an automotive vehicle having driving wheels. When the engine is in a specific engine operating region, changeover of the valve lift characteristic is inhibited even when an excessive slip state of the driving wheel(s) is detected, whereas changeover of the valve lift characteristic is permitted when the engine is in other specific operating regions which are defined by the engine rotational speed and the engine load. Restoration of the changed valve lift characteristic to one selected before the change is retarded when the excessive slip state of the driving wheel(s) is eliminated. The engine output is reduced when the valve lift characteristic is restored.

21 Claims, 9 Drawing Sheets

VALVE CONTROL SYSTEM FOR INTERNAL COMBUSTION ENGINES

BACKGROUND OF THE INVENTION

This invention relates to a valve control system for internal combustion engines which are capable of changing the valve lift characteristic of inlet and/or exhaust valves, and more particularly to a valve control system of this kind for automotive vehicles equipped with driving wheel slip control systems.

There is shown in FIG. 8 the general relationship between the engine rotational speed and the engine output torque in an internal combustion engine which is capable of switching the valve lift characteristic of inlet and/or exhaust valves between a low speed valve lift characteristic suitable for a lower engine rotational speed region and a high speed valve lift characteristic suitable for a higher engine rotational speed region. (Throughout the specification and claims, the term "valve lift characteristic" represents a valve opening period of an inlet and/or exhaust valve and/or an amount of lift of the inlet and/or exhaust valve.) In the lower engine rotational speed region, larger engine output torque can be obtained when the low speed valve lift characteristic is selected, while in the higher engine rotational speed region, larger engine output torque can be obtained when the high speed valve lift characteristic is selected. Normally, the valve lift characteristic which enables to obtain larger engine output torque is selected depending upon engine operating conditions (mainly upon the engine rotational speed). Therefore, if the valve lift characteristic is changed to one which is opposite to a normally-selected valve lift characteristic, the engine output torque can be decreased.

This feature of selection of the valve timing is utilized, e.g. in Japanese Patent Application No. 63-330938 filed by the present assignee. This application proposes a valve control system in which the degree of slip of driving wheels is reduced by changing the valve lift characteristic to one which enables to obtain smaller engine output torque (traction control).

The above proposed valve control system is effective in suppressing excessive slip of the driving wheels, since the engine output can be effectively decreased by fuel cut when the excessive slip state of the driving wheels is detected. However, according to the above valve control system, when the excessive slip state of the driving wheels is eliminated by the traction control, the valve lift characteristic is restored to the normal one. On the other hand, since the engine output is reduced by the traction control to cause a decrease in the engine rotational speed, the valve lift characteristic is changed over at a predetermined engine rotational speed. This can increase the frequency of changeover of the valve lift characteristic. More specifically, if the engine output is decreased while an excessive slip state of the driving wheels is detected, the engine operating condition changes, in particular, the engine rotational speed decreases, so that the engine, if it is in a higher engine rotational speed region, undergoes transition to a lower engine rotational speed region whereby the valve lift characteristic is changed over. Since the excessive slip state of the driving wheel(s) is being detected, the valve lift characteristic is changed from one enabling to obtain a larger engine output in the lower engine rotational speed region to one enabling to obtain a larger engine output in the higher engine rotational speed region, i.e. in a manner opposite to normal changeover of the valve lift characteristic carried out when the vehicle is not under the traction control. Thereafter, when the excessive slip of the driving wheels is eliminated, the valve lift characteristic is changed to a normal one enabling to obtain a larger engine output in the lower engine rotational speed region again, so that the engine output increases to increase the engine rotational speed, which results in changeover of the valve lift characteristic to one enabling to obtain a larger engine output in the higher engine rotational speed region. If an excessive slip state of the driving wheels is detected again when the engine is in the higher engine rotational speed region, the above process of the valve lift characteristic changeover control is repeated. Therefore, the above valve control system suffers from the problem that the valve lift characteristic is frequently changed to shorten the life of the valve lift characteristic-changeover mechanism.

Further, if the valve timing is restored to the normal one immediately after an excessive slip of the driving wheel has been eliminated, there is a possibility that the engine output torque suddenly increases to cause excessive slip of the driving wheels again, depending on road surface conditions, to necessitate changeover of the valve lift characteristic to an opposite one enabling to obtain a smaller engine output again. Thus, the changeover of the valve characteristic can also be repeated frequently to shorten the life of the valve lift characteristic-changeover mechanism.

Still further, if the valve lift characteristic is restored to a normal one enabling to obtain a larger engine output after elimination of an excessive slip state of the driving wheels, the engine output torque suddenly increases to thereby degrade the driveability and even lead to occurrence of excessive slip of the driving wheels immediately after restoration of the normal valve lift characteristic.

SUMMARY OF THE INVENTION

It is an object of the invention to provide a valve control system for an internal combustion engine, which is capable of carrying out changeover of the valve lift characteristic for suppressing excessive slip of driving wheel(s) of the vehicle, at a reduced frequency to thereby prolong the life of the valve lift characteristic-changeover mechanism.

It is another object of the invention to provide a driving wheel slip control system which is capable of preventing a drastic increase in the engine output torque occurring when the valve lift characteristic is restored to a normal one after elimination of the excessive slip of the driving wheels of the vehicle, to thereby improve the driveability of the vehicle.

To attain the above objects, according to a first aspect of the invention, there is provided a valve control system for controlling the valve lift characteristic of at least one set of a set of inlet valves and a set of exhaust valves of an internal combustion engine installed in an automotive vehicle having driving wheels, including driving wheel slip-detecting means for detecting an excessive slip state of at least one of the driving wheels, and valve lift characteristic-changing means responsive to an output from the driving wheel slip-detecting means for changing the valve lift characteristic of the at least one set of the set of inlet valves and the set of exhaust valves.

The valve control system according to the first aspect of the invention is characterized by comprising:

determining means for determining whether the engine is in a specific engine operating region; and changing operation-inhibiting means for inhibiting the valve lift characteristic-changing means from changing the valve lift characteristic when the determining means determines that the engine is in the specific engine operating region.

The valve control system according to a second aspect of the invention is characterized by comprising:

engine rotational speed-detecting means for detecting the rotational speed of the engine;

first determining means for determining a first predetermined valve control region in which the rotational speed of the engine detected by the engine rotational speed-detecting means is not higher than a first predetermined value;

first enabling means for enabling the valve lift characteristic-changing means to change the valve lift characteristic when the first determining means determines that the engine is in the first predetermined valve control region;

second determining means for determining a second predetermined valve control region in which the rotational speed of the engine detected by the engine rotational speed-detecting means is not lower than a second predetermined value which is higher than the first predetermined value; and second enabling means for enabling the valve lift characteristic-changing means to change the valve lift characteristic when the second determining means determines that the engine is in the second predetermined valve control region.

Preferably, the valve control system according to the second aspect of the invention includes load parameter-detecting means for detecting load on the engine, and third enabling means for enabling the valve lift characteristic-changing means to change the valve lift characteristic when the load parameter detected by the load parameter-detecting means is not lower than a predetermined value when it is determined that the engine is in at least one of the first and second predetermined valve control regions.

More preferably, the predetermined value of the load parameter is set at a higher value in the second predetermined valve control region than in the first predetermined valve control region.

The valve control system according to a third aspect of the invention is characterized by comprising:

engine rotational speed-detecting means for detecting the rotational speed of the engine;

load parameter-detecting means for detecting a load parameter indicative of load on the engine;

determining means responsive to an output from the engine rotational speed-detecting means and an output from the load parameter-detecting means for determining whether or not the engine is in a predetermined valve control region defined by the rotational speed of the engine and the load on the engine; and enabling means for enabling the valve lift characteristic-changing means to change the valve lift characteristic when the determining means determines that the engine is in the predetermined valve control region.

Preferably, the valve control system according to any of the above aspects of the invention includes engine output-reducing means responsive to the output from the driving wheel slip-detecting means for reducing the output of the engine, preferably, when the excessive slip state of the at least one of the driving wheels is detected.

The valve control system according to a fourth aspect of the invention, which may be combined with the valve control system according to any of the first to third aspects, is characterized by comprising:

retarding means responsive to the output from the driving wheel slip-detecting means for retarding restoration of the valve lift characteristic changed by the valve lift characteristic-changing means to one selected before the change when elimination of the excessive slip state of the at least one of the driving wheels is detected.

Preferably, the valve control system according to the fourth aspect of the invention includes engine output-reducing means responsive to the output from the driving wheel slip-detecting means for reducing an output of the engine when the excessive slip state of the at least one of the driving wheels is detected, and inhibiting means for inhibiting the engine output-reducing means from reducing the output of the engine when elimination of the excessive slip state of the at least one of the driving wheels is detected, and wherein the retarding means permits restoration of the valve lift characteristic after the inhibiting means has inhibited the engine output-reducing means from reducing the output of the engine.

More preferably, the inhibiting means operates in a manner such that the rate of reduction of the output of the engine by the engine output-reducing means progressively decreases.

The valve control system according to a fifth aspect of the invention, which may be combined with the valve control system according to any of the first to third aspects, is characterized by comprising:

valve lift characteristic-restoring means responsive to the output from the driving wheel slip-detecting means for restoring the valve lift characteristic changed by the valve lift characteristic-changing means to one selected before the change when elimination of the excessive slip state of the at least one of the driving wheels is detected; and engine output-reducing means responsive to restoring operation of the valve lift characteristic-restoring means for reducing the output of the engine.

Preferably, the engine output-reducing means operates for a predetermined time period after the valve lift characteristic-restoring means has restored the valve lift characteristic.

The above and other objects, features, and advantages of the invention will become more apparent from the ensuing detailed description taken in conjunction with the accompanying drawings.

BRIEF DESCRIPTION OF THE DRAWINGS

FIG. 2b is a diagram showing a control device for the device of FIG. 2a;

DETAILED DESCRIPTION

The invention will now be described in detail with reference to the drawings showing embodiments thereof.

FIGS. 1 to 6 show a first embodiment of the invention.

Figure 1:
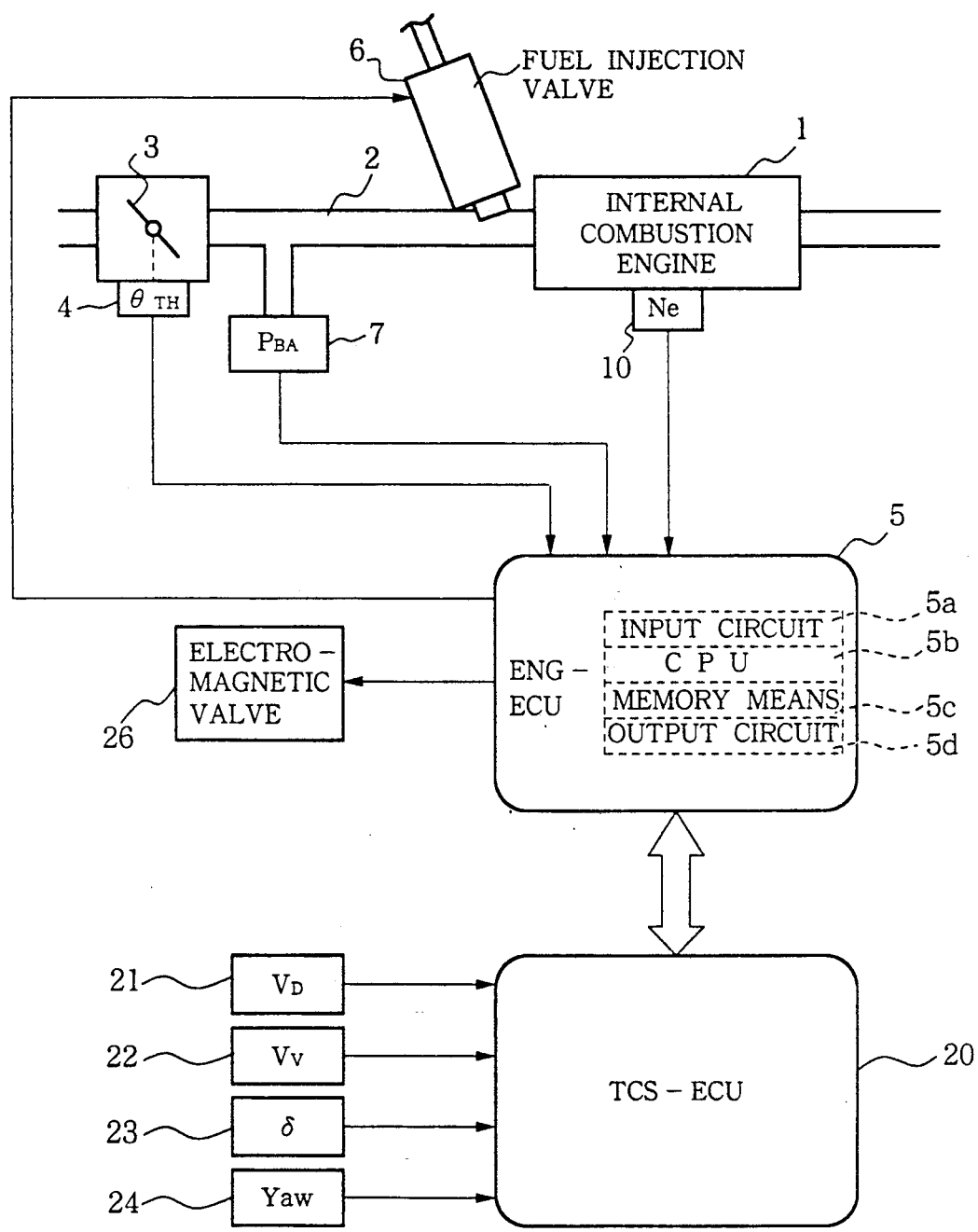
FIG. 1 is a schematic diagram showing the whole arrangement of a valve control system according to one embodiment of the invention.

Referring first to FIG. 1, there is shown the whole arrangement of a fuel supply control system for an internal combustion engine, which incorporates a valve control system according to the invention. In the figure, reference numeral 1 designates an internal combustion engine of six cylinder DOHC type for automotive vehicles, in which two pairs of inlet and exhaust valves are provided for each cylinder. Connected to the cylinder block of the engine 1 is an intake pipe 2 in which is arranged a throttle valve 3. A throttle valve opening ($\theta_{TH}$) sensor 4 is connected to the throttle valve 3 for generating an electric signal indicative of the sensed throttle valve opening and supplying same to an electronic control unit 5 for controlling the engine (hereinafter called "the ENG-ECU").

Fuel injection valves 6, only one of which is shown, are inserted into the intake pipe at locations intermediate between the cylinder block of the engine 1 and the throttle valve 3 and slightly upstream of respective intake valves, not shown. The fuel injection valves 6 are connected to a fuel pump, not shown, and electrically connected to the ENG-ECU 5 to have their valve opening periods controlled by signals therefrom.

On the other hand, an intake pipe absolute pressure ($P_{BA}$) sensor 7 is provided in communication with the interior of the intake pipe 2 at a location immediately downstream of the throttle valve 3 for supplying an electric signal indicative of the sensed absolute pressure within the intake pipe 2 to the ENG-ECU 5. An engine rotational speed (Ne) sensor 10 is arranged in facing relation to a camshaft or a crankshaft, not shown, of the engine 1. The engine rotational speed sensor 10 generates a pulse as a TDC signal pulse at each of predetermined crank angles whenever the crankshaft rotates through 120 degrees, and the pulse is supplied to the ENG-ECU 5.

Further electrically connected to the ENG-ECU 5 is an electronic control unit 20 for sensing driving wheel slip (hereinafter called "TCS-ECU"), to which are connected a driving wheel speed sensor 21 for detecting the rotational speed $V_D$ of driving wheels, not shown, a trailing wheel speed sensor 22 for detecting a rotational speed $V_V$ of trailing wheels, not shown, a steering angle sensor for detecting the steering angle $\delta$ of a steering wheel, not shown, and a yaw rate sensor 24 for detecting the yaw rate Yaw of the vehicle. Signals indicative of the rotational speeds of the wheels, the steering angle, and the yaw rate respectively detected by the sensors 21 to 24 are supplied to the TCS-ECU 20. The driving wheel speed sensor 21 detects an average value of the speed of a right driving wheel and the speed of a left driving wheel, while the trailing wheel speed sensor 22 detects an average value of the speed of a right trailing wheel and the speed of a left trailing wheel, respectively. However, this is not limitative, and the speeds of driving and trailing wheels on one side of the vehicle may be detected (provided that the driving wheel speed and the trailing wheel speed are detected on the same side). The steering sensor 23 generates a signal indicative of an absolute angle of steering such that the rightward steering angle is represented by a positive value (e.g. $+1°, +2°\ldots$) and the leftward steering angle by a negative value (e.g. $-1°, -2°\ldots$), with the neutral position of the steering wheel represented by zero degree. The yaw rate sensor 24 detects an actual yaw rate based on the difference between separately detected speeds of the right and left trailing wheels. As the yaw rate sensor, a gyroscope may be used which is adapted to directly detect the actual yaw rate.

The ENG-ECU 5 is also connected to an electromagnetic valve 26, which changes over the valve timing of inlet and exhaust valves, as described in detail hereinafter. The term "valve timing" is identical in meaning to the term "valve lift characteristic".

The ENG-ECU 5 comprises an input circuit 5a having the functions of shaping the waveforms of input signals from various sensors and the TCS-ECU 20, shifting the voltage levels of sensor output signals to a predetermined level, converting analog signals from analog-output sensors to digital signals, and so forth, a central processing unit (hereinafter called "the CPU") 5b, memory means 5c storing various operational programs which are executed in the CPU 5b and for storing results of calculations therefrom, etc., and an output circuit 5d which outputs driving signals to the fuel injection valves 6 and the electromagnetic valve 26.

The CPU 5b operates in response to engine parameter signals from the above-mentioned sensors and other sensors, not shown, to determine operating conditions in which the engine 1 is operating, such as an air-fuel ratio feedback control region for controlling the air-fuel ratio to a stoichiometric air-fuel ratio, and open-loop control regions, and calculates, based upon the determined operating conditions, the valve opening period or fuel injection period $T_{OUT}$ over which the fuel injection valves 6 are to be opened, by the use of the following equation (1) in synchronism with inputting of TDC signal pulses to the ECU 5:

$$T_{OUT} = Ti \times K_{TCS} \times K_1 + K_2 \quad (1)$$

where Ti represents a basic fuel amount, more specifically a basic fuel injection period of the fuel injection valves 6, which is determined based upon the engine rotational speed Ne and the intake pipe absolute pressure $P_{BA}$.

$K_{TCS}$ represents a leaning coefficient which is set to a value smaller than 1.0, as described in detail hereinafter, when an excessive slip state of the driving wheels is detected, and set to 1.0 when no excessive slip state is detected.

$K_1$ and $K_2$ represent other correction coefficients and correction variables, respectively, which are calculated based on various engine operating parameter signals to such values as to optimize operating characteristics of the engine such as fuel consumption and accelerability, depending on operating conditions of the engine.

The CPU 5b turns the electromagnetic valve 26 on and off to effect changeover of the valve timing in response to the detected engine operating conditions (e.g. sensed values of the engine rotational speed Ne and the intake pipe absolute pressure $P_{BA}$) and the slip state of driving wheels, as described hereinafter.

The CPU 5b supplies the output circuit 5d with driving signals for driving the fuel injection valves 6 and the electromagnetic valve 26 based upon the results of the above determinations and calculations.

In this embodiment, the ENG-ECU comprises part of valve lift characteristic-changing means, determining means, changing operation-inhibiting means, enabling means, part of engine outout-reducing means, retarding means, inhibiting means, and valve lift characteristic-restoring means, while the TCS-ECU 20 comprises part of driving wheel slip-detecting means.

Figure 2A:
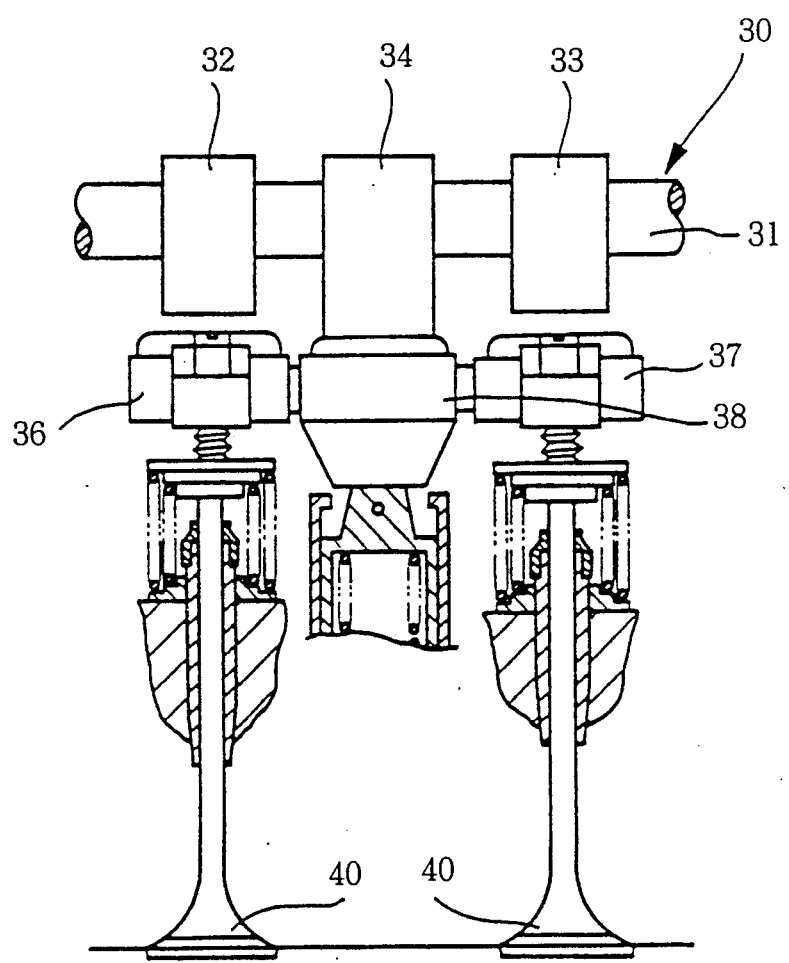
FIG. 2a is a diagram showing an inlet valve-operating device of an engine.
Figure 2B:
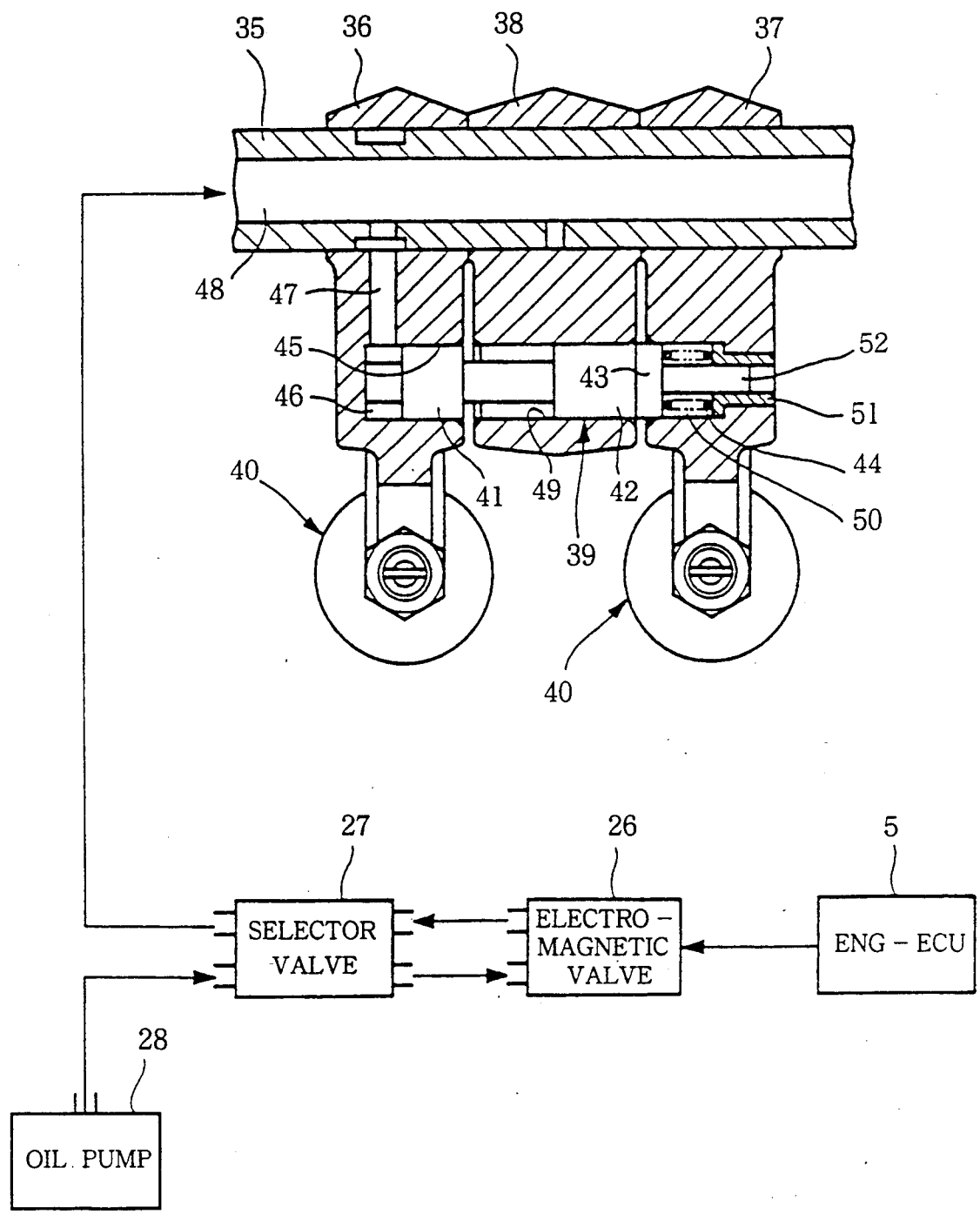

FIGS. 2a and 2b shown an inlet valve-operating device 30 for driving the inlet valves 40 of each cylinder of the engine 1. An exhaust valve-operating device, not shown, basically having the same construction as the device 30 is provided for the exhaust valves. The inlet valve-operating device 30 comprises a camshaft 31 rotatively driven by a crankshaft, not shown, of the engine at a speed ratio of ½ relative to the latter, a high speed cam 34 and low speed cams 32, 33 secured on the camshaft 31, the three cams 32 to 34 being provided for each cylinder, a rocker shaft 35 extending parallel with the camshaft 31, first and second driving rocker arms 36 and 37, and a free rocker arm 38 pivotally mounted on the rocker shaft 35, the three arms 36 to 38 being provided for each cylinder, and a connection-changeover mechanism 39 arranged in the corresponding rocker arms 36, 37, 38 for each cylinder.

As shown in FIG. 2b, the connection-changeover mechanism 39 comprises a first changeover pin 41 capable of connecting the first driving rocker arm 36 with the free rocker arm 38, a second changeover pin 42 capable of connecting the second driving rocker arm 37 with the free rocker arm 38, a restriction pin 43 for restricting the movement of the first and second changeover pins 41, 42, and a return spring 44 urging the pins 41, 42, 43 in the rocker arm-disconnecting direction.

The first driving rocker arm 36 is formed therein with a first guide bore 45 extending parallel with the rocker shaft 35 with one end thereof closed and the other end opening in a side face thereof facing the free rocker arm 38. The first changeover pin 41 is slidably fitted in the first guide bore 45, defining an oil hydraulic chamber 46 between one end thereof and the closed end of the first guide bore 45. Further, a passage 47 extends in the rocker arm 36 and the rocker shaft 35 from the oil hydraulic chamber 46 and opens into an oil feeding passage 48 formed in the rocker shaft 35 so that the oil feeding passage 48 permanently communicates via the passage 47 with the oil hydraulic chamber 46 irrespective of rocking motion of the first driving rocker arm 36.

The free rocker arm 38 is formed therein with a guide through hole 49 at a location corresponding to the first guide bore 45, which extends through the free rocker arm 38 and parallel with the rocker shaft 35. The second changeover pin 42 is slidably fitted in the guide through hole 49, with one end thereof abutting on an opposed end face of the first changeover pin 41.

The second driving rocker arm 37 is formed therein with a second guide bore 50 at a location corresponding to the guide through hole 49, which extends parallel with the rocker shaft 35 with one end thereof opening toward the free rocker arm 38. The restriction pin 43 in the form of a disc is slidably fitted in the second guide bore 50, in a fashion abutting on the other end of the second changeover pin 42. Further, the second guide bore 50 has a guide sleeve 51 fitted therein, in which is slidably fitted an axial rod 52 which coaxially and integrally projects from the restriction pin 43. The return spring 44 is interposed between the guide sleeve 51 and the restriction pin 43 and urges the pins 41, 42, 43 toward the oil hydraulic chamber 46.

In the connection-changeover mechanism 39 constructed as above, when the pressure in the oil hydraulic chamber 46 is increased, the first changeover pin 41 is forced to move into the guide through hole 49 and at the same time the second changeover pin 42 is urgedly moved into the second guide bore 50 to connect the rocker arms 36, 37, 38 together. When the pressure in the oil hydraulic chamber 46 is decreased, the first changeover pin 41 is moved back by the urging force of the spring 44 into a position in which the end face thereof abutting on the second changeover pin 42 corresponds in location to the space between the first driving rocker arm 36 and the free rocker arm 38, and at the same time the second changeover pin 42 is moved back into a position in which the end face thereof abutting on the restriction pin 43 corresponds in location to the space between the free rocker arm 38 and the second driving rocker arm 37, whereby the rocker arms 36, 38, 37 become disconnected from each other.

The oil feeding passage 48 within the rocker shaft 35 is connected to an oil pump 28 via a selector valve 27 which operates to change over the oil pressure within the oil feeding passage 48 and hence the oil pressure within the oil hydraulic chamber 46 of the connection-changeover mechanism 39 between high and low levels. The selector valve 27 is connected to the electromagnetic valve 26, and the ENG-ECU controls the changeover operation of the selector valve 27 via the electromagnetic valve 26.

The inlet valve-operating device 30 of the engine 1 constructed as above operates in the following manner (in addition, the exhaust valve-operating device operates similarly):

When the ENG-ECU 5 sends out a valve-opening instruction signal to the electromagnetic valve 26, the electromagnetic valve 26 is opened to thereby cause the selector valve 27 to open, so that the oil pressure in the oil feeding passage 48 is increased. This causes the connection-changeover mechanism 39 to operate to connect the rocker arms 36, 37, 38 together, whereby the high speed cam 34 operates the rocker arms 36, 37, 38 in unison (FIG. 2a shows this state) to cause each pair of inlet valves 40 to open and close at high speed valve timing in which the valve-opening period and the valve lift amount are relatively greater.

On the other hand, when the ENG-ECU 5 supplies a valve-closing instruction signal to the electromagnetic valve 26, the electromagnetic valve 26 and in turn the selector valve 27 are closed to thereby decrease the oil pressure in the oil feeding passage 48. This causes the connection-changeover mechanism 39 to operate to disconnect the rocker arms 36, 37, 38 from each other, whereby the low speed cams 32, 33 operate the corresponding rocker arms 36, 37 to cause the pair of inlet valves 40 to open and close at low speed valve timing in which the valve-opening period and the valve lift amount are relatively smaller.

Figure 3:
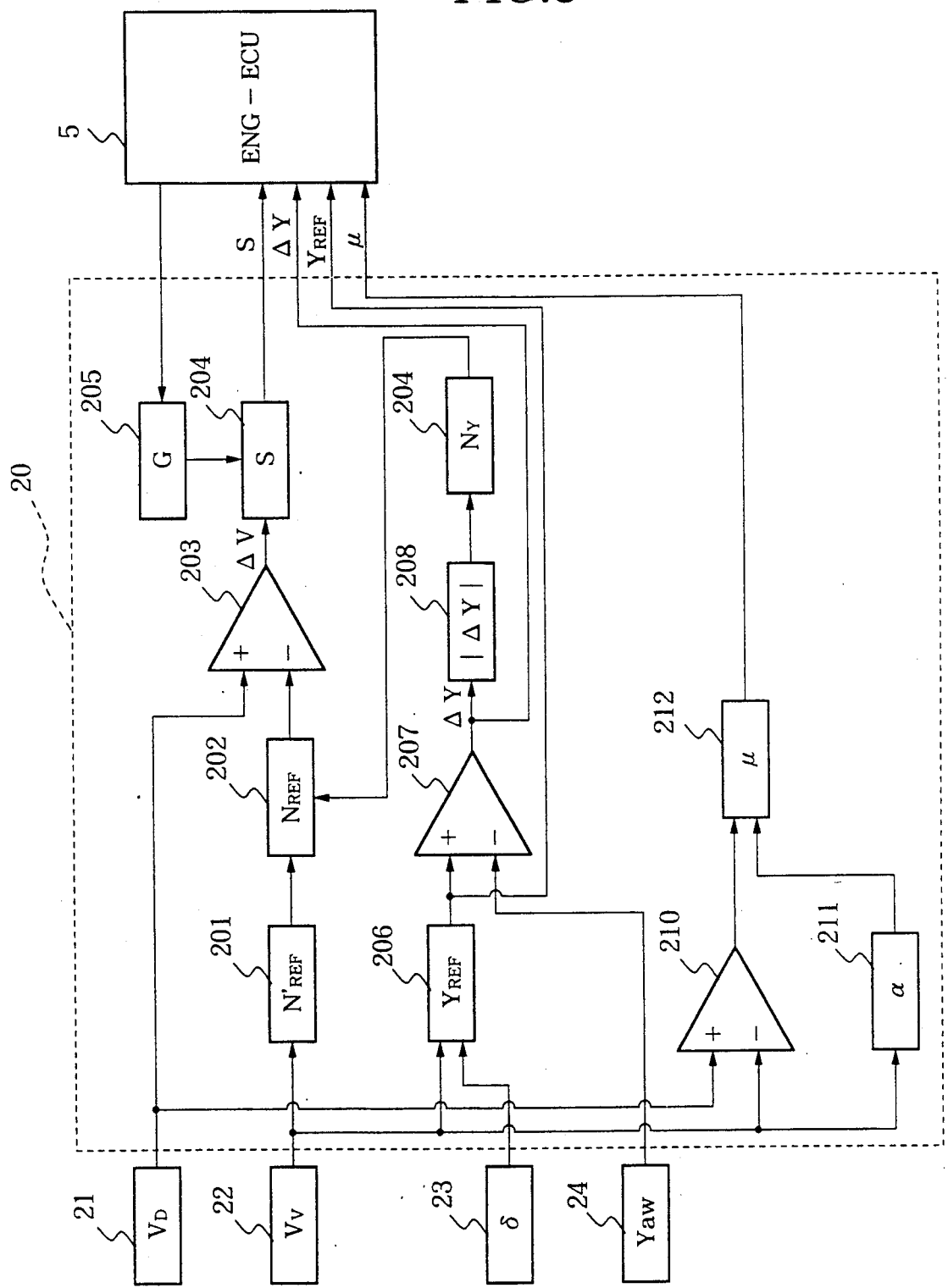
FIG. 3 is a block diagram showing the arrangement of an electronic control unit for detecting the slip of driving wheels.

FIG. 3 shows the internal construction of the TCS-ECU 20. A signal indicative of the driving wheel speed $V_D$ from the driving wheel speed sensor 21 is supplied to a first subtraction circuit 203 and a third subtraction circuit 210. A signal indicative of the vehicle speed $V_V$ from the trailing wheel speed sensor 22 is supplied to a first reference driving wheel speed ($N'_{REF}$)-calculating circuit 201, a reference yaw rate ($Y_{REF}$)-calculating circuit 206, a third subtraction circuit 210, and an acceleration ($\alpha$)-calculating circuit 211. A signal indicative of the steering angle $\delta$ from the steering angle sensor 23 is supplied to the reference yaw rate-calculating circuit 206, while a signal indicative of the yaw rate Yaw from the yaw rate sensor 24 is supplied to a second subtraction circuit 207.

The first reference driving wheel speed-calculating circuit 201 calculates a first reference driving wheel speed $N'_{REF}$ based on the trailing wheel speed, i.e. vehicle speed $V_V$, and supplies the calculated first reference driving wheel speed $N'_{REF}$ to a second reference driving wheel speed-calculating circuit 202. The first reference driving wheel speed $N'_{REF}$ is determined based on the relationship between the vehicle speed and the driving wheel speed, which holds when the slip rate of driving wheels is approximately 15% (at which the maximum driving force can be obtained) and the vehicle is making a straight advance.

The reference yaw rate-calculating circuit 206 calculates a reference yaw rate $Y_{REF}$ as a desired yaw rate currently expected from the vehicle speed $V_V$ and the steering angle $\delta$, and supplies the calculated reference yaw rate $Y_{REF}$ to the second subtraction circuit 207. The reference yaw rate is calculated by an equation based on a mathematical model of a vehicle (disclosed e.g. by Japanese Provisional Patent Publication (Kokai) No. 61-27763) or by an equation based on a physical model of same (disclosed e.g. by Japanese Provisional Patent Publication (Kokai) No. 63-218866). The second subtraction circuit 207 calculates a yaw rate difference $\Delta Y$ between the reference yaw rate $Y_{REF}$ and the detected actual yaw rate Yaw, and supplies the calculated yaw rate difference $\Delta Y$ to an absolute value-calculating circuit 208. The absolute value-calculating circuit 208 converts the yaw rate difference $\Delta Y$ into an absolute value of $\Delta Y$, and supplies the latter to a correction value ($N_Y$)-calculating circuit 209. The correction value-calculating circuit 209 calculates a correction value $N_Y$ for the reference driving wheel speed based on the absolute value $|\Delta Y|$ of the yaw rate difference, and supplies the calculated correction value $N_Y$ to the second reference driving wheel speed-calculating circuit 202. The correction value $N_Y$ is for correcting the first reference driving wheel speed $N'_{REF}$ to a smaller value when there is a large difference (corresponding to the yaw rate difference $\Delta Y$) between a yawing movement of the vehicle intended by the driver (corresponding to the reference yaw rate $Y_{REF}$) and an actual yawing movement of the vehicle (corresponding to the actual yaw rate Yaw), and therefore contributes to decreasing the engine output.

The second reference driving wheel speed-calculating circuit 202 calculates the second reference driving wheel speed $N_{REF}$ based upon the following equation (2):

$$N_{REF} = N'_{REF} - N_Y \quad (2)$$

and supplies the calculated second reference driving wheel speed $N_{REF}$ to the first subtraction circuit 203.

The first subtraction circuit 203 calculates a speed difference $\Delta V$ between the driving wheel speed $V_D$ and the second reference driving wheel speed $N_{REF}$, and supplies the calculated speed difference $\Delta V$ to a slip signal (S)-calculating circuit 204. The slip signal-calculating circuit 204 applies control gains $K_P$, $K_I$, and $K_D$ for PID control supplied from the ENG-ECU 5 via a gain setting circuit 205 to the following equations (3) to (6) to calculate a slip signal S:

$$S = SP_n + SI_n + SD_n \quad (3)$$

$$SP_n = K_P \times \Delta V_n \quad (4)$$

$$SI_n = SI_{n-1} + K_I \times \Delta V_n \quad (5)$$

$$SD_n = K_D \times (\Delta V_n - \Delta V_{n-1}) \quad (6)$$

The subscripts n and n—1 indicate that the values concerned are values assumed upon occurrence of the present TDC signal pulse and values assumed upon occurrence of the last TDC signal pulse, respectively, since the calculation is repeated whenever a TDC signal pulse is generated.

The slip signal S is supplied to the ENG-ECU 5 together with the reference yaw rate $Y_{REF}$ and the yaw rate difference $\Delta Y$.

In the meanwhile, the third subtraction circuit 210 calculates a speed difference $\Delta V_W$ between the driving wheel speed $V_D$ and the vehicle speed $V_V$, and supplies the calculated speed difference $\Delta V_W$ to a friction coefficient ($\mu$)-calculating circuit 212. The acceleration-calculating circuit 211 calculates the acceleration $\alpha$ of the vehicle speed $V_V$, and supplies the calculated acceleration $\alpha$ to the friction coefficient-calculating circuit 212. The friction coefficient-calculating circuit 212 calculates an estimated value $\mu$ of friction coefficient of the road surface (hereinafter simply referred to as "$\mu$ of the road surface), and supplies the calculated $\mu$ of the road surface to the ENG-ECU 5.

In this connection, the manner of obtaining the correction coefficient $\mu$ of the road surface is not limited to the above-mentioned estimation based on the speed difference $\Delta V_W$ and the acceleration $\alpha$ of the vehicle, and the $\mu$ of the road surface may be detected by a sensor (e.g. a combination of an ultrasonic sensor and a road surface temperature sensor) which detects an actual correction coefficient.

Figure 4A:
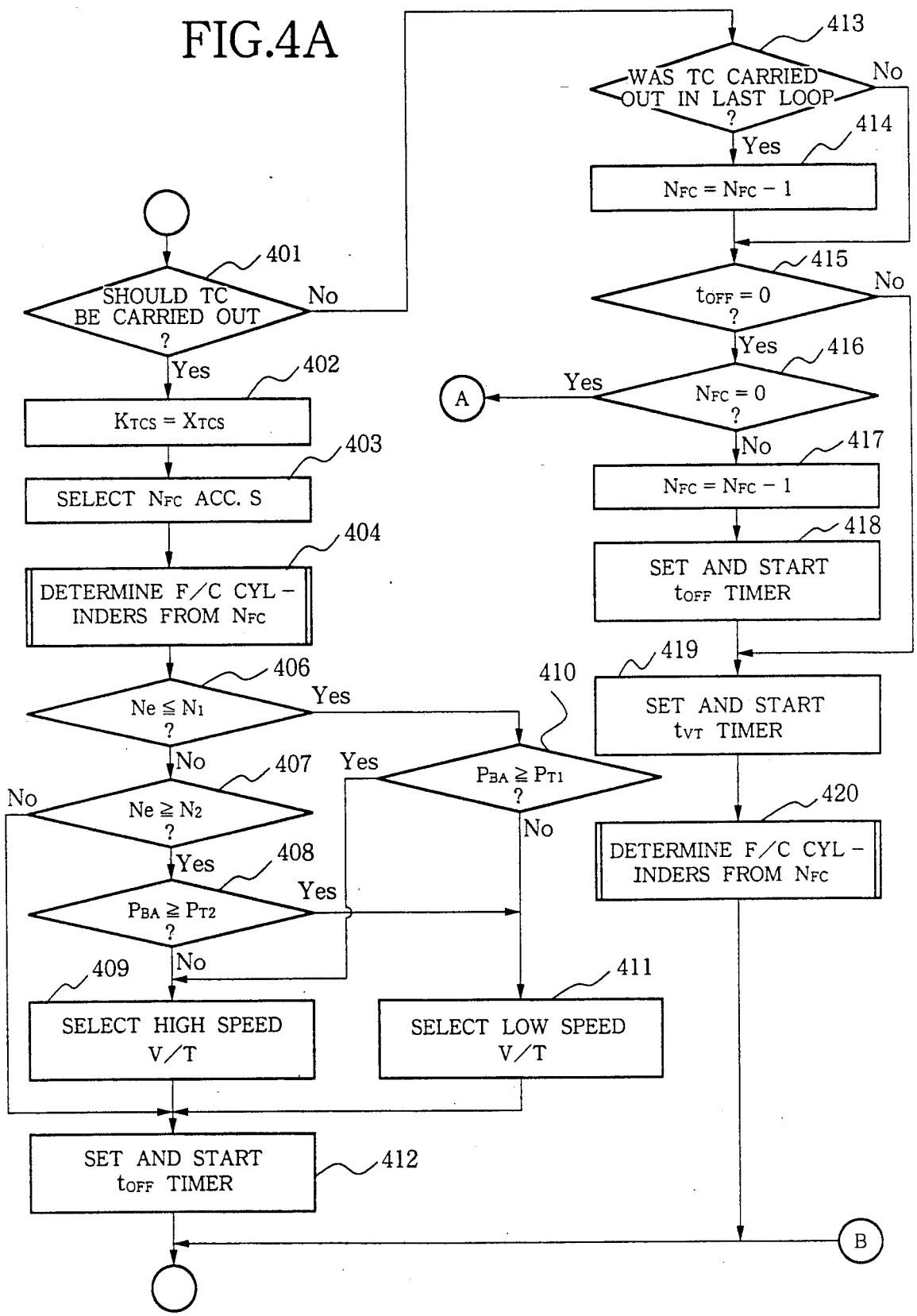
FIG. 4, comprised of FIG. 4A and 4B, is a flowchart showing a program for carrying out the driving wheel slip control and the valve lift characteristic-changing control according to a first embodiment of the invention.
Figure 4B:
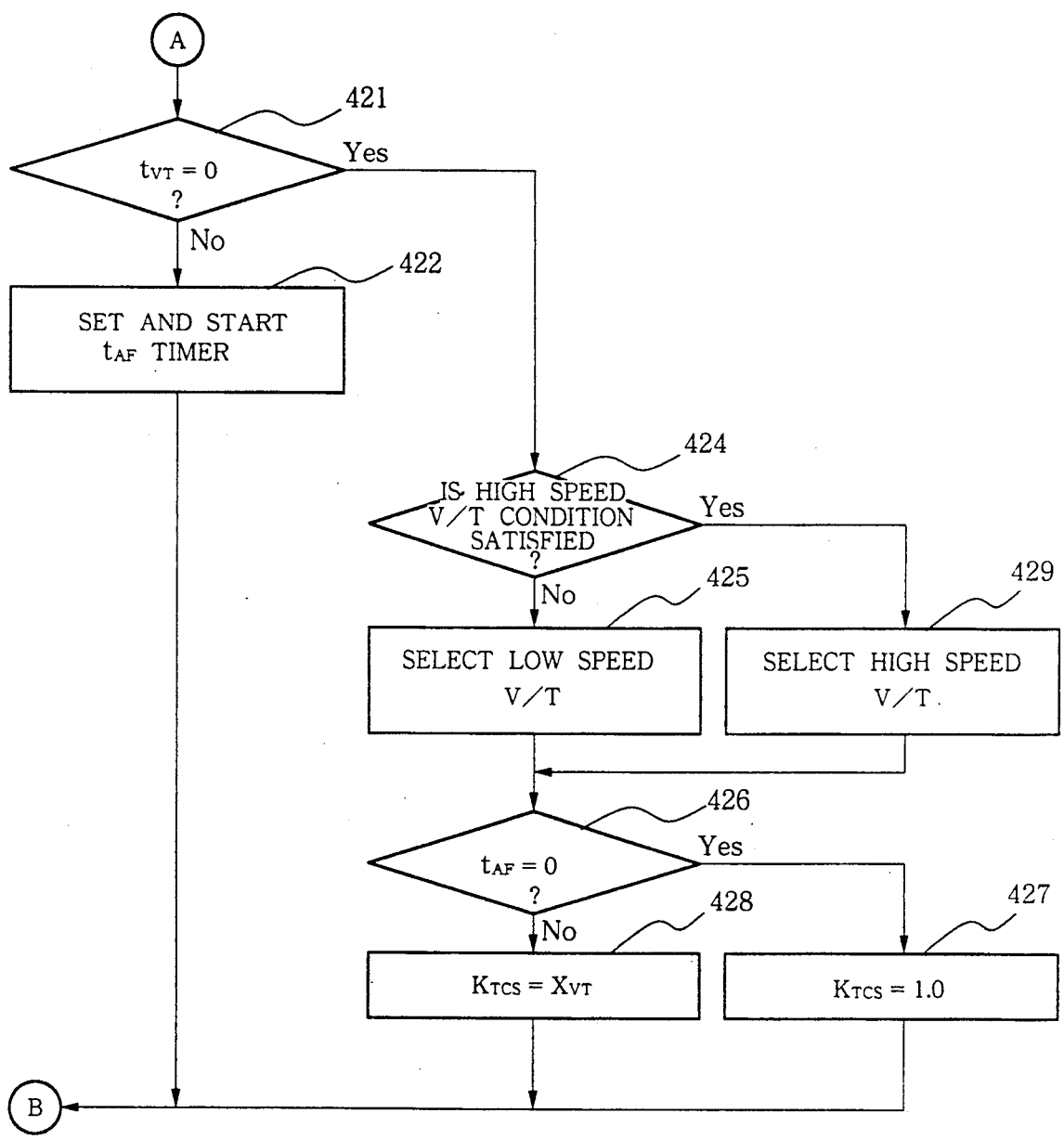
Figure 5:
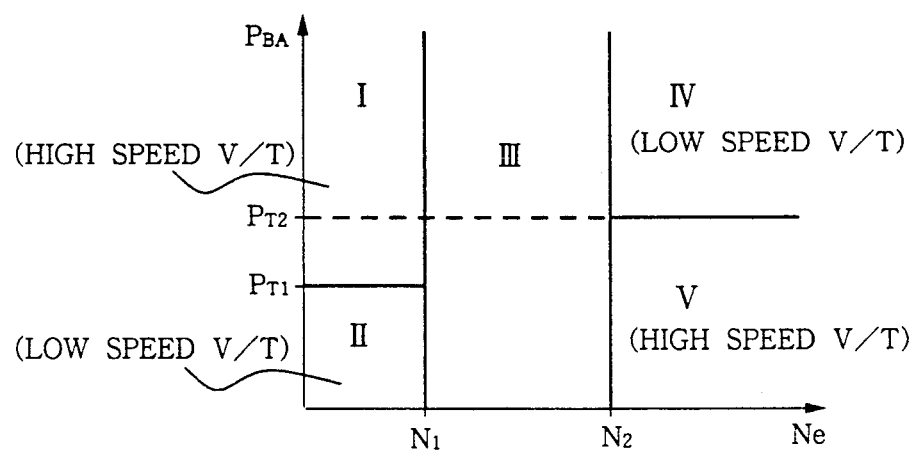
FIG. 5 is a diagram useful in explaining the manner of selecting a valve lift characteristic depending on the engine rotational speed and the intake pipe absolute pressure during the driving wheel slip control.

FIG. 4 shows a program executed by the ENG-ECU 5 for carrying out engine output control (hereinafter simply referred to as "the traction control") through leaning of an air-fuel mixture supplied to the engine 1 and cutting-off of the supply of the mixture based on the signals from the TCS-ECU, as well as the valve timing control. This program is executed in synchromism with generation of each TDC signal pulse.

First, at a step 401, it is determined whether or not the traction control should be carried out. This determination depends on whether or not a predetermined condition (e.g. the slip signal S is above a predetermined value) is satisfied. If the answer to this question is affirmative (Yes), i.e. if it is determined that the traction control should be carried out, the leaning coefficient $K_{TCS}$ is set at a step 402 to a first predetermined leaning value $X_{TCS}$ (which causes the air/fuel ratio to be leaned to approximately 18.0). Then, the number $N_{FC}$ of cylinders which are to be subjected to fuel cut is selected at a step 403 depending on the value of the slip signal S, and cylinders which are to be subjected to fuel cut are decided at a step 404 in accordance with the selected number $N_{FC}$. The number $N_{FC}$ of cylinders to be subjected to fuel cut is set to a larger value as the value of the slip signal S increases, i.e. as the magnitude of slip of at least one driving wheel is larger. For example, with an engine having six cylinders No. 1 to No. 6, if the $N_{FC}=3$, the cylinders Nos. 1, 3, and 5 are subjected to fuel cut.

Next, at a step 406, it is determined whether or not the engine rotational speed Ne is equal to or lower than a first engine rotational speed $N_1$ (e.g. 2,000 rpm). If the answer to this question is affirmative (Yes), i.e. if $Ne \leq N_1$, it is determined at a step 410 whether or not the intake pipe absolute pressure $P_{BA}$ is equal to or higher than a first predetermined pressure level $P_{T1}$ (e.g. 550 mmHg). If the answer to this question is negative, i.e. if $P_{BA} < P_{T1}$, the low speed valve timing is selected at a step 411, whereas if the answer is affirmative, i.e. if $P_{BA} \geq P_{T1}$, the high speed valve timing is selected at a step 409, and then a $t_{OFF}$ timer referred to hereinafter is set to a first predetermined time period $t_{OFF}$ and started at a step 412, followed by terminating the program.

If the answer to the question of the step 406 is negative (No), i.e. if $Ne > N_1$, it is determined at a step 407 whether or not the engine rotational speed Ne is equal to or higher than a second predetermined engine rotational speed $N_2$ (e.g. 5,000 rpm) which is higher than the first predetermined engine rotational speed $N_1$. If the answer to this question is affirmative (Yes), i.e. if $Ne \geq N_2$, it is determined at a step 408 whether or not the intake pipe absolute pressure $P_{BA}$ is equal to or higher than a second predetermined pressure level $P_{T2}$ (e.g. 620 mmHg) which is higher than the first predetermined pressure level. If the answer to this question is affirmative (Yes), i.e. if $P_{BA} \geq P_{T2}$, the low speed valve timing is selected at the step 411, whereas if the answer is negative (No), i.e. if $P_{BA} < P_{T2}$, the high speed valve timing is selected at the step 409, and then the program proceeds to the step 412.

If both the answers to the questions of the steps 406 and 407 are negative (No), i.e. if $N_1 < Ne < N_2$, the program jumps to the step 412 to thereby hold the valve timing selected up to the last loop.

As described above, in a specific engine operating condition region ($N_1 < Ne < N_2$, i.e. Region III in FIG. 5), the valve timing is held at a preceding one during traction control, so that frequency of chaning of the valve timing according to the traction control can be reduced. Particularly when the traction control is carried out by reduction of fuel supply (fuel cut and mixture-leaning) in addition to changing the valve timing to one enabling to obtain smaller engine output torque (opposite valve timing), the engine rotational speed is greatly reduced, so that the valve timing is liable to be changed very frequently. Therefore, for a valve control system which carries out such traction control, holding the valve timing in a specific engine operating condition region as carried out in the present invention is very effective in reducing the frequency of changing of the valve timing.

Further, in view of the fact that excessive slip of the driving wheel(s) is less liable to occur when the engine is under a low load condition than when it is under a high load condition, according to the invention, even when the engine is outside the specific engine operating condition region ($Ne \leq N_1$ or $Ne \geq N_2$), if it is under a low load condition (regions II and V in FIG. 5), the valve timing is not changed to the opposite valve timing even when an excessive slip state is detected, whereby the frequency of changing of the valve timing according to the traction control is reduced. Besides, if the valve timing is changed to the opposite one according to traction control in a low engine rotational speed and low load region (region II in FIG. 5), the engine output is reduced to a larger degree than in the other engine operating condition regions so that excessive slip is rapidly suppressed to cause changeover of the valve timing to a normal one enabling to obtain a larger engine output, which results in increased frequency of changing of the valve timing. However, according to the invention, in such a low engine rotational speed and low load region, changeover of the valve timing to the opposite one is inhibited when an excessive slip state of the driving wheel(s) is detected, so that the frequency of changing of the valve timing can be reduced.

Moreover, a reference value ($P_{T2}$) of engine load under the condition of $Ne \geq N_2$ is set at a value higher than a reference value ($P_{T1}$) of same under the condition of $Ne \leq N_1$, to thereby narrow the engine operating condition region (region IV in FIG. 5) which requires changing of the valve timing to the opposite one according to the traction control, and hence reduce the frequency of changing of the valve timing.

Thus, the reduced frequency of changing of the valve timing can prolong the life of the connection-changeover mechanism 39.

Further, in this embodiment, the traction control is carried out by fuel cut and mixture-leaning in addition to changing of the valve timing to the opposite one. Since in an engine which carries out such traction control, the engine load can be accurately grasped from the intake pipe absolute pressure $P_{BA}$ which also varies depending upon whether fuel cut and/or mixture-leaning is carried out, it is possible to control changeover of the valve timing in a manner suitably responsive to the engine load, by the use of the intake pipe absolute pressure $P_{BA}$ as a parameter of the engine load.

If the answer to the question of the step 401 is negative (No), i.e. if it is determined that the traction control is not required, it is determined at a step 413 whether or not the traction control was carried out in the last loop. If the answer to this question is negative (No), the program jumps to a step 415, whereas if the answer is affirmative (Yes), the number $N_{FC}$ of cylinders to be subjected to fuel cut is decreased by 1 at a step 414, and then the program proceeds to the step 415. At the step 415, it is determined whether or not the value of the $t_{OFF}$ timer is equal to 0. If the answer to this question is negative (No), i.e. if the first predetermined time peirod $t_{OFF}$ has not elapsed, a $t_{VT}$ timer referred to hereinafter is set to a second predetermined time period $t_{VT}$, and started (a step 419). At the same time, similarly to the step 404, the number of cylinders to be subjected to fuel cut is determined in accordance with the number $N_{FC}$ at a step 420, followed by terminating the present program.

If the answer to the question of the step 415 is affirmative (Yes), i.e. $t_{OFF}=0$, it is determined at a step 416 whether or not the number $N_{FC}$ of cylinders to be subjected to fuel cut is equal to 0. If the answer to this question is negative (No), i.e. if $N_{FC}>0$, the number $N_{FC}$ is decreased by 1 at a step 417. Then, the $t_{OFF}$ timer is set to the first predetermined time period $t_{OFF}$ and started (a step 418), and the program proceeds to the step 419.

The above-described steps 413 to 420 carry out the engine output control when the vehicle has shifted from a state in which the traction control is required to a state in which it is not required. Immediately after the traction control becomes unnecessary, the number $N_{FC}$ of cylinders to be subjected to fuel cut is decreased by 1 (the step 414), and thereafter, the number $N_{FC}$ is decreased by 1 whenever the first predetermined time period $t_{OFF}$ elapses until it becomes equal to 0 (the steps 416 and 417). Thus, the number of cylinders to be subjected to fuel cut is progressively decreased, which enables to prevent a sudden rise in the engine output immediately after the excessive slip state of the driving wheel(s) has been eliminated to thereby improve the driveability of the vehicle.

If the answer to the question of the step 416 is affirmative (Yes), i.e. if $N_{FC}=0$, it is determined at a step 421 whether or not the value of the $t_{VT}$ timer is equal to 0. If the answer to this question is negative (No), i.e. if $t_{VT}>0$, a $t_{AF}$ timer referred to hereinafter is set to a third predeterimined time period $t_{AF}$ and started at a step 422, followed by terminating the present program.

Figure 7:
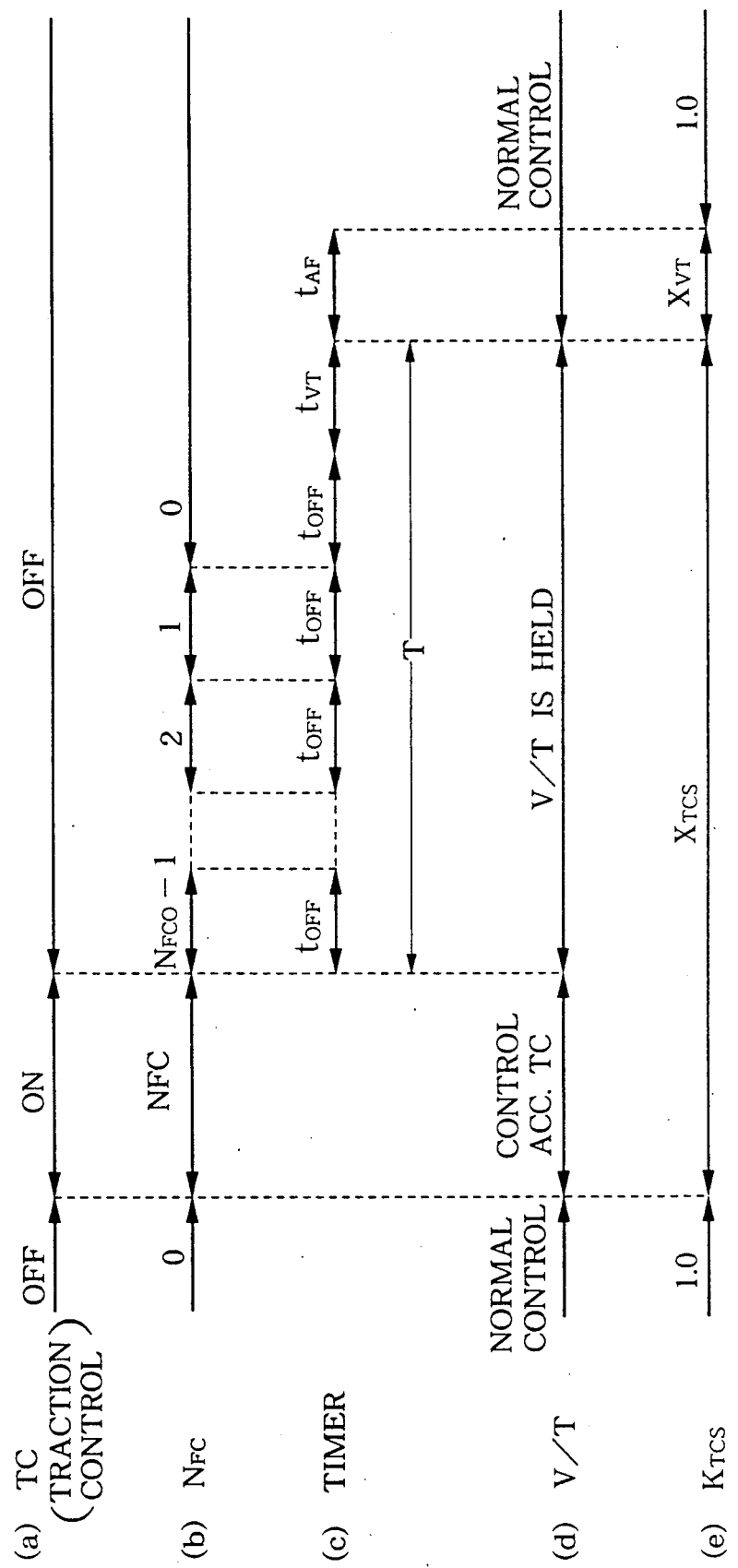
FIG. 7 is a timing chart of fuel cut, valve timing changeover, setting of a leaning coefficient according to the traction control.
Figure 8:
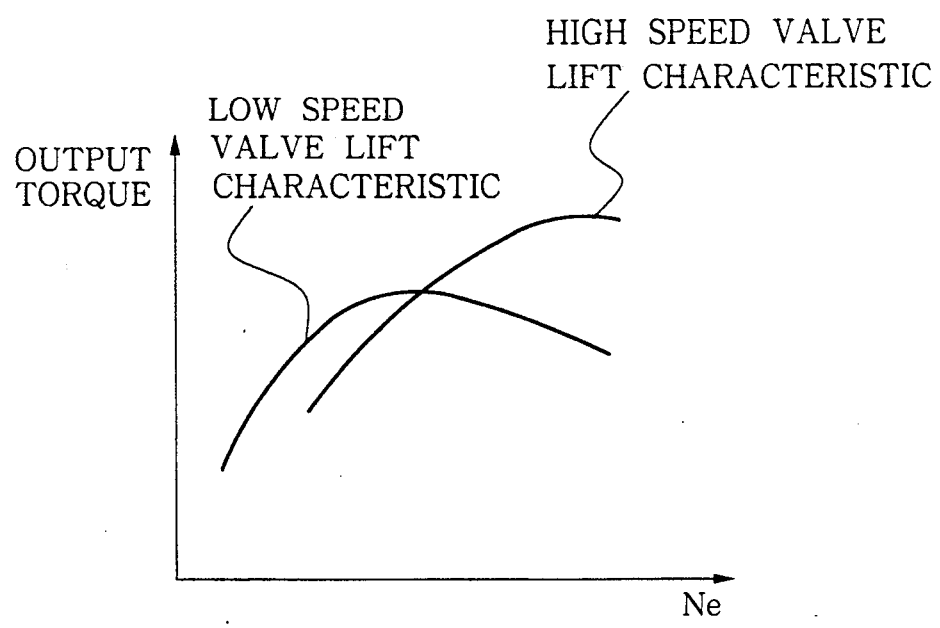
FIG. 8 is a graph showing variations in the engine output torque relative to the engine rotational speed, plotted with respect to the low speed and high speed valve lift characteristics.

According to the steps 413 to 422, when the traction control becomes unnecessary, changeover of the valve timing is inhibited over a time period T defined by the following equation (7) so that the valve timing is held at one selected immediately before the traction control becomes unnecessary over the time period T (see FIG. 7):

$$T = t_{OFF} \times N_{FC0} + t_{VT} \quad (7)$$

where $N_{FC0}$ is a value of $N_{FC}$ assumed immediately before the traction control becomes unnecessary.

The engine output control by the steps 413 to 421 makes it possible to prevent increase in the frequency of changeover of the valve timing resulting from hunting, i.e. repeated changeover of the valve timing such that elimination of an excessive slip state of the driving wheel(s) causes changeover of the valve timing to normal one, which results in an excessive slip state, causing another changeover of the valve timing.

In this manner, recurrence of excessive slip of the driving wheel(s) and hence hunting can be prevented, which are liable to occur if the valve timing is restored to normal one immediately upon termination of the traction control. Incidentally, a shortage in the engine output is caused by holding the restoration of the valve timing to the normal one enabling to obtain a larger engine output over the time period T. This shortage is compensated for by progressively decreasing the number of cylinders subjected to fuel cut.

If the answer to the question of the step 421 is affirmative (Yes), i.e. if $t_{VT}=0$, it is determined at a step 424 whether or not a condition that the high speed valve timing should be selected is satisfied. This determination is carried out e.g. based upon the engine rotational speed Ne, the intake pipe absolute pressure $P_{BA}$, the engine coolant temperature $T_W$, etc. to thereby select valve timing enabling to obtain a larger engine output.

Figure 6:
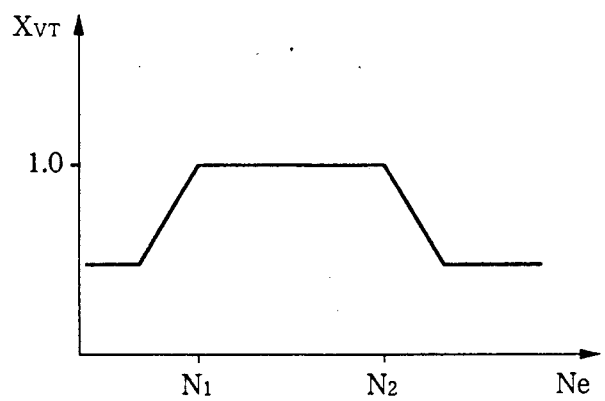
FIG. 6 is a graph showing an example of setting of a predetermined value for leaning an air-fuel mixture.

If the answer to the question of the step 424 is negative (No), i.e. the condition of selecting the high speed valve timing is not satisfied, the low speed valve timing is selected at a step 425, and then it is determined at a step 426 whether or not the value of the $t_{AF}$ timer is equal to 0. If the answer to this question is affirmative (Yes), i.e. if $t_{AF}=0$, the program proceeds to a step 427, where the leaning coefficient $K_{TCS}$ is set to a value of 1.0, followed by terminating the present program. If the answer to the question of the step 426 is negative (No), i.e. if $t_{AF}>0$, the leaning coefficient $K_{TCS}$ is set to a second predetermined leaning value $X_{VT}$ at a step 428, followed by terminating the present program (see FIG. 7). The second predetermined leaning value $X_{VT}$ is set, e.g. in relation to the engine rotational speed Ne as shown in FIG. 6.

If the answer to the question of the step 424 is affirmative (Yes), i.e. if the condition of selecting the high speed valve timing is satisfied, the high speed valve timing is selected at a step 429, and then, the program proceeds to the step 426.

The above steps 424 to 429 carry out selection of the normal valve timing, i.e. the valve timing enabling to obtain a larger engine output is selected. However, when the valve timing is changed over after completion of the traction control, the air/fuel ratio is leaned by setting $K_{TCS}$ to $X_{VT}$ until the third predetermined time period $t_{AF}$ elapses. Thus, when the valve timing is changed to the valve timing enabling to obtain a larger engine output after completion of the traction control during which the valve timing enabling to obtain a smaller engine output is selected, the rate of increase in the engine output caused by the changeover of the valve timing is made smaller by leaning of the air/fuel ratio to thereby enable to prevent a sudden increase in the engine output and hence improve the driveability.

In this embodiment of the invention, the $K_{TCS}$ is set to the value $X_{VT}$ before the third predetermined time period $t_{AF}$ elapses and to 1.0 after the lapse of the time period $t_{AF}$. Alternatively, the coefficient $K_{TCS}$ may be gradually decreased from the value $X_{VT}$ to 1.0 with the lapse of time. Further, instead of setting the leaning coefficient $K_{TCS}$ to the second predetermined leaning value $X_{VT}$, the timing of ignition may be retarded to thereby prevent a sudden increase in the engine output.

Further, in the above described embodiment, a sudden rise in the engine output is prevented by leaning the mixture when the valve timing is restored to normal one. However, instead, such a sudden rise in the engine output may be prevented by reducing the amount of intake air. In such an alternative case, the time of restoration of the valve timing should be retarded by a time period corresponding to the time lag from the time point the throttle valve opening is narrowed to the time point a sudden rise in the engine output is actually suppressed.

Still further, although in the above described embodiment, the traction control is carried out by leaning the air/fuel ratio of a mixture supplied to the engine and cutting off the supply of fuel to the engine, the traction control may be carried out by narrowing the throttle valve opening or by some other means. In such an alternative case, as a parameter indicative of load on the engine, the position of the accelerator pedal is preferably used rather than the intake pipe absolute pressure $P_{BA}$.

What is claimed is:

1. In a valve control system for controlling the valve lift characteristic of at least one set of a set of inlet valves and a set of exhaust valves of an internal combustion engine installed in an automotive vehicle having driving wheels, including driving wheel slip-detecting means for detecting an excessive slip state of at least one of said driving wheels, and valve lift characteristic-changing means responsive to an output from said driving wheel slip-detecting means for changing the valve lift characteristic of said at least one set of said set of inlet valves and said set of exhaust valves, the improvement comprising:

determining means for determining whether said engine is in a specific engine operating region; and changing operation-inhibiting means for inhibiting said valve lift characteristic-changing means from changing the valve lift characteristic when said determining means determines that said engine is in said specific engine operating region.

2. In a valve control system for controlling the valve lift characteristic of at least one set of a set of inlet valves and a set of exhaust valves of an internal combustion engine installed in an automotive vehicle having driving wheels, including driving wheel slip-detecting means for detecting an excessive slip state of at least one of said driving wheels, and valve lift characteristic-changing means responsive to an output from said driving wheel slip-detecting means for changing the valve lift characteristic of said at least one set of said set of inlet valves and said set of exhaust valves, the improvement comprising:

engine rotational speed-detecting means for detecting a rotational speed of said engine;

first determining means for determining a first predetermined valve control region in which the rotational speed of said engine detected by said engine rotational speed-detecting means is not higher than a first predetermined value;

first enabling means for enabling said valve lift characteristic-changing means to change the valve lift characteristic when said first determining means determines that said engine is in said first predetermined valve control region;

second determining means for determining a second predetermined valve control region in which the rotational speed of said engine detected by said engine rotational speed-detecting means is not lower than a second predetermined value which is higher than said first predetermined value; and second enabling means for enabling said valve lift characteristic-changing means to change the valve lift characteristic when said second determining means determines that said engine is in said second predetermined valve control region.

3. A valve control system according to claim 2, including load parameter-detecting means for detecting load on said engine, and third enabling means for enabling said valve lift characteristic-changing means to change the valve lift characteristic when said load parameter detected by said load parameter-detecting means is not lower than a predetermined value when it is determined that said engine is in at least one of said first and second predetermined valve control regions.

4. A valve control system according to claim 3, wherein said predetermined value of said load parameter is set at a higher value in said second predetermined valve control region than in said first predetermined valve control region.

5. In a valve control system for controlling the valve lift characteristic of at least one set of a set of inlet valves and a set of exhaust valves of an internal combustion engine installed in an automotive vehicle having driving wheels, including driving wheel slip-detecting means for detecting an excessive slip state of at least one of said driving wheels, and valve lift characteristic-changing means responsive to an output from said driving wheel slip-detecting means for changing the valve lift characteristic of said at least one set of said set of inlet valves and said set of exhaust valves, the improvement comprising:

engine rotational speed-detecting means for detecing a rotational speed of said engine;

load parameter-detecting means for detecting a load parameter indicative of load on said engine;

determining means responsive to an output from said engine rotational speed-detecting means and an output from said load parameter-detecting means for determining whether or not said engine is in a predetermined valve control region defined by the rotational speed of said engine and said load on said engine; and enabling means for enabling said valve lift characteristic-changing means to change the valve lift characteristic when said determining means determines that said engine is in said predetermined valve control region.

6. A valve control system according to claim 3 or 5, wherein said engine has an intake pipe, said load parameter being absolute pressure within said intake pipe.

7. A valve control system according to any of claims 1, 2, or 5, including engine output-reducing means responsive to said output from said driving wheel slip-detecting means for reducing an output of said engine when said excessive slip state of said at least one of said driving wheels is detected.

8. A valve control system according to claim 7, wherein said output-reducing means comprises fuel amount-reducing means for reducing an amount of fuel supplied to said engine.

9. A valve control system according to any of claims 1 to 5, including retarding means responsive to said output from said driving wheel slip-detecting means for retarding restoration of the valve lift characteristic changed by said valve lift characteristic-changing means to one selected before the change when elimination of said excessive slip state of said at least one of said driving wheels is detected.

10. A valve control system according to claim 9, wherein said retarding means includes time-counting means for counting a predetermined retarding time period.

11. A valve control system according to claim 9, including engine output-reducing means responsive to said output from said driving wheel slip-detecting means for reducing an output of said engine when said excessive slip state of said at least one of said driving wheels is detected, and inhibiting means for inhibiting said engine output-reducing means from reducing said output of said engine when elimination of said excessive slip state of said at least one of said driving wheels is detected, and wherein said retarding means permits restoration of the valve lift characteristic after said inhibiting means has inhibited said engine output-reducing means from reducing said output of said engine.

12. A valve control system according to claim 11, wherein said inhibiting means operates in a manner such that the rate of reduction of said output of said engine by said engine output-reducing means progressively decreases.

13. A valve control system according to claim 9, including valve lift characteristic-restoring means responsive to said output from said driving wheel slip-detecting means for restoring the valve lift characteristic changed by said valve lift characteristic-changing means to one selected before the change when elimination of said excessive slip state of said at least one of said driving wheels is detected, and engine output-reducing means responsive to restoring operation of said valve lift characteristic-restoring means for reducing an output of said engine.

14. A valve control system according to claim 13, wherein said engine output-reducing means operates for a predetermined time period after said valve lift characteristic-restoring means has restored the valve lift characteristic.

15. In a valve control system for controlling the valve lift characteristic of at least one set of a set of inlet valves and a set of exhaust valves of an internal combustion engine installed in an automotive vehicle having driving wheels, including driving wheel slip-detecting means for detecting an excessive slip state of at least one of said driving wheels, and valve lift characteristic-changing means responsive to an output from said driving wheel slip-detecting means for changing the valve lift characteristic of said at least one set of said set of inlet valves and said set of exhaust valves, the improvement comprising:
retarding means responsive to said output from said driving wheel slip-detecting means for retarding restoration of the valve lift characteristic changed by said valve lift characteristic-changing means to one selected before the change when elimination of said excessive slip state of said at least one of said driving wheels is detected.

16. A valve control system according to claim 15, wherein said retarding means includes time-counting means for counting a predetermined retarding time period.

17. A valve control system according to claim 15, including engine output-reducing means responsive to said output from said driving wheel slip-detecting means for reducing an output of said engine when said excessive slip state of said at least one of said driving wheels is detected, and inhibiting means for inhibiting said engine output-reducing means from reducing said output of said engine when elimination of said excessive slip state of said at least one of said driving wheels is detected, and wherein said retarding means permits restoration of the valve lift characteristic after said inhibiting means has inhibited said engine output-reducing means from reducing said output of said engine.

18. A valve control system according to claim 17, wherein said inhibiting means operates in a manner such that the rate of reduction of said output of said engine by said engine output-reducing means progressively decreases.

19. In a valve control system for controlling the valve lift characteristic of at least one set of a set of inlet valves and a set of exhaust valves of an internal combustion engine installed in an automotive vehicle having driving wheels, including driving wheel slip-detecting means for detecting an excessive slip state of at least one of said driving wheels, and valve lift characteristic-changing means responsive to an output from said driving wheel slip-detecting means for changing the valve lift characteristic of said at least one set of said set of inlet valves and said set of exhaust valves, the improvement comprising:
valve lift characteristic-restoring means responsive to said output from said driving wheel slip-detecting means for restoring the valve lift characteristic changed by said valve lift characteristc-changing means to one selected before the change when elimination of said excessive slip state of said at least one of said driving wheels is detected; and
engine output-reducing means responsive to restoring operation of said valve lift characteristic-restoring means for reducing an output of said engine.

20. A valve control system according to claim 19, wherein said engine output-reducing means operates for a predetermined time period after said valve lift characteristic-restoring means has restored the valve lift characteristic.

21. A valve control system for controlling the valve lift characteristic of at least one set of a set of inlet valves and a set of exhaust valves of an internal combustion engine installed in an automotive vehicle having driving wheels, comprising:
driving wheel slip-detecting means for detecting an excessive slip state of at least one of said driving wheels;
valve lift characteristic-changing means responsive to an output from said driving wheel slip-detecting means for changing the valve lift characteristic of said at least one set of said set of inlet valves and said set of exhaust valves;
suppressing means for suppressing excessive slip of said at least one of said driving wheels; and
means for reducing frequency of changing of the valve lift characteristic of said at least one of said set of inlet valves and said set of exhaust valves while said suppressing means operates to suppress said excessive slip.

* * * * *